(12) United States Patent
Naruse

(10) Patent No.: US 9,656,431 B2
(45) Date of Patent: May 23, 2017

(54) TIRE PUNCTURE SEALANT

(71) Applicant: THE YOKOHAMA RUBBER CO., LTD., Minato-Ku, Tokyo (JP)

(72) Inventor: Masahiro Naruse, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/910,865

(22) PCT Filed: Aug. 7, 2014

(86) PCT No.: PCT/JP2014/070937
§ 371 (c)(1),
(2) Date: Feb. 8, 2016

(87) PCT Pub. No.: WO2015/020170
PCT Pub. Date: Feb. 12, 2015

(65) Prior Publication Data
US 2016/0185054 A1    Jun. 30, 2016

(30) Foreign Application Priority Data

Aug. 9, 2013 (JP) ................................. 2013-166301

(51) Int. Cl.
B29C 73/16 (2006.01)
C08L 7/02 (2006.01)
C08L 33/06 (2006.01)

(52) U.S. Cl.
CPC .................................. B29C 73/163 (2013.01)

(58) Field of Classification Search
CPC .......... B29C 73/163; C08L 7/02; C08L 33/06; C08L 33/064
See application file for complete search history.

(56) References Cited

U.S. PATENT DOCUMENTS

| | | | | |
|---|---|---|---|---|
| 5,434,216 A * | 7/1995 | Mudge | ................. | C09J 151/003 156/332 |
| 2007/0203260 A1 * | 8/2007 | Okamatsu | ............. | B29C 73/163 523/166 |
| 2008/0188621 A1 * | 8/2008 | Ichino | ................... | B60C 1/0016 525/232 |
| 2009/0023837 A1 * | 1/2009 | Okamatsu | ............. | B29C 73/163 523/166 |
| 2010/0331448 A1 * | 12/2010 | Ichikawa | ............... | B29C 73/163 523/166 |
| 2011/0104377 A1 * | 5/2011 | Zapf | ..................... | C04B 20/023 427/385.5 |
| 2011/0144237 A1 * | 6/2011 | Takahara | .................. | C08L 7/00 523/166 |
| 2011/0201722 A1 * | 8/2011 | Takahara | .............. | B29C 73/163 523/166 |
| 2012/0041099 A1 * | 2/2012 | Takahara | .............. | B29C 73/163 523/166 |
| 2012/0309867 A1 * | 12/2012 | Takahara | .............. | B29C 73/163 523/166 |
| 2013/0203890 A1 * | 8/2013 | Lopitaux | ............... | B60C 1/0016 523/156 |
| 2013/0338287 A1 * | 12/2013 | Lolli | ..................... | B29C 73/163 524/388 |
| 2014/0004350 A1 * | 1/2014 | Shibutani | ................ | C08L 29/04 428/413 |
| 2014/0127516 A1 * | 5/2014 | Wang | ..................... | C08G 18/06 428/422 |
| 2014/0221527 A1 * | 8/2014 | Naruse | .................. | B29C 73/163 523/166 |
| 2015/0315368 A1 * | 11/2015 | Okamatsu | ............. | B29C 73/163 106/471 |
| 2016/0185053 A1 * | 6/2016 | Naruse | .................. | B29C 73/163 523/166 |

FOREIGN PATENT DOCUMENTS

JP        5168394 B2    3/2013

* cited by examiner

Primary Examiner — Liam J Heincer
(74) Attorney, Agent, or Firm — Carrier Blackman & Associates, P.C.; Joseph P. Carrier; Anne G. Sabourin

(57) ABSTRACT

An object of the present invention is to provide a tire puncture sealant having excellent low-temperature injection performance and sealing performance. The tire puncture sealant of the present invention contains a natural rubber latex (A); and a vinyl versatate copolymer resin emulsion (B), the vinyl versatate copolymer resin emulsion being an emulsion of a vinyl versatate copolymer resin (b1) containing vinyl versatate and an unsaturated organic acid as monomer units.

8 Claims, No Drawings

TIRE PUNCTURE SEALANT

TECHNICAL FIELD

The present invention relates to a tire puncture sealant.

BACKGROUND ART

Patent Document 1 describes a "tire puncture sealant containing a natural rubber latex, a synthetic resin emulsion, and propylene glycol", wherein the synthetic resin contained in the synthetic resin emulsion is an "ethylene-vinyl acetate-vinyl versatate copolymer resin" ([Claim 1] and [Claim 3]).

CITATION LIST

Patent Literature

Patent Document 1: Japanese Patent No. 5168394B

SUMMARY OF INVENTION

Technical Problem

In recent years, there has been an increase in the performance required of tire puncture sealants. In particular, there is a demand for improvements in low-temperature properties such as injection performance in low-temperature environments (low-temperature injection performance).

As a result of investigating the tire puncture sealant described in Patent Document 1, the present inventors discovered that low-temperature injection performance is improved by reducing the amount of emulsifier used in an emulsion of an "ethylene-vinyl acetate-vinyl versatate copolymer resin".

However, at this time, although the low-temperature injection performance is improved by reducing the amount of emulsifier, it became clear that the storage performance, which is the basic performance of the tire puncture sealant, is diminished.

The present invention was conceived in light of the issues described above, and an object of the present invention is to provide a tire puncture sealant having excellent low-temperature injection performance and storage performance.

Solution to Problem

As a result of conducting dedicated research in order to achieve the object described above, the present inventors discovered that it is possible to improve the low-temperature injection performance without reducing the storage performance by copolymerizing an unsaturated organic acid with a vinyl versatate copolymer resin contained in a tire puncture sealant, and the present inventors thereby completed the present invention.

Specifically, the present invention provides the following (1) to (5).

(1) A tire puncture sealant comprising a natural rubber latex (A); and a vinyl versatate copolymer resin emulsion (B), the vinyl versatate copolymer resin emulsion being an emulsion of a vinyl versatate copolymer resin (b1) containing vinyl versatate and an unsaturated organic acid as monomer units.

(2) The tire puncture sealant described in (1), wherein a proportion of the unsaturated organic acid with respect to all monomer units constituting the vinyl versatate copolymer resin (b1) is from 0.01 to 2.00 mass %.

(3) The tire puncture sealant described in (1) or (2), wherein the vinyl versatate copolymer resin emulsion (B) contains an emulsifier (b2) containing polyvinyl alcohol, and a content of the emulsifier (b2) is from 0.8 to 3.0 mass % with respect to a solid content of the vinyl versatate copolymer resin emulsion (B).

(4) The tire puncture sealant described in any one of (1) to (3), wherein the vinyl versatate copolymer resin (b1) is an unsaturated organic acid-ethylene-vinyl acetate-vinyl versatate copolymer resin.

(5) The tire puncture sealant according to any one of (1) to (4), wherein a mass ratio (A/B) of a solid content of the natural rubber latex (A) to a solid content of the vinyl versatate copolymer resin emulsion (B) is from 90/10 to 40/60.

Advantageous Effects of Invention

With the present invention, it is possible to provide a tire puncture sealant having excellent low-temperature injection performance and storage performance.

DESCRIPTION OF EMBODIMENTS

[Tire Puncture Sealant]

The tire puncture sealant of the present invention is a tire puncture sealant containing a natural rubber latex (A); and a vinyl versatate copolymer resin emulsion (B), the vinyl versatate copolymer resin emulsion being an emulsion of a vinyl versatate copolymer resin (b1) containing vinyl versatate and an unsaturated organic acid as monomer units.

For example, when the amount of en emulsifier for dispersing the particles of the vinyl versatate copolymer resin (b1) (see the emulsifier (b2) described below) is reduced, the low-temperature injection performance can be improved. In this case, the ionic repulsive force between particles becomes small and the particles become close to one another due to the reduced amount of the emulsifier, which diminishes the storage performance.

However, by copolymerizing an unsaturated organic acid such as a (meth)acrylic acid as a monomer unit constituting the vinyl versatate copolymer resin (b1), acid groups originating from the unsaturated organic acid appear on the particle surface. As a result, the ionic repulsive force between particles becomes large, which makes it possible to improve the low-temperature injection performance without diminishing the storage performance, even if the amount of the emulsifier is reduced.

The above mechanism is a conjecture, but if the mechanism is a mechanism other than that described above, it is still within the scope of the present invention.

Each constituent contained in the tire puncture sealant of the present invention will be described in detail hereinafter.

[Natural Rubber Latex (A)]

The natural rubber latex (A) is not particularly limited, and a conventionally known latex may be used. For example, a deproteinized natural rubber latex prepared by removing proteins from a natural rubber latex may be suitably used. If a protein content of the natural rubber latex (A) is low, it is possible to reduce the amount of ammonia produced, which is desirable from the perspectives of preventing corrosion damage of steel cords by ammonia and preventing the generation of irritating odors. Specific examples of natural rubber latex include Deproteinized Natural Rubber Latex (SeLatex series, manufactured by SRI Hybrid Ltd.), Deproteinized Natural Rubber Latex (HA, manufactured by Nomura Trading Co., Ltd.), and Ultra-low Ammonia Natural Rubber Latex (ULACOL, manufactured by Regitex Co., Ltd.).

One type of the natural rubber latex (A) may be used alone, or two or more types may be used in combination.

The weight average molecular weight (Mw) of the natural rubber contained in the natural rubber latex (A) is not particularly limited.

Note that the weight average molecular weight (Mw) is the weight average molecular weight expressed in terms of polystyrene, which is determined by gel permeation chromatography (GPC) using tetrahydrofuran as a solvent (same hereafter).

In addition, the tire puncture sealant of the present invention may further contain a synthetic rubber latex in addition to the natural rubber latex (A), examples of which include SBR latex, NBR latex, carboxy-modified NBR latex, and carboxy-modified SBR latex.

[Vinyl Versatate Copolymer Resin Emulsion (B)]

The vinyl versatate copolymer resin emulsion (B) is an emulsion in which a vinyl versatate copolymer resin (b1) is dispersed as a dispersoid in a dispersion medium such as water.

At this time, the phase of the vinyl versatate copolymer resin (b1) serving as a dispersoid may be a liquid phase or a solid phase.

In general, a system in which a liquid phase dispersoid is dispersed in a liquid phase dispersion medium is called an "emulsion", and a system in which a solid phase dispersoid is dispersed in a liquid phase dispersion medium is called a "suspension"; however, in the present invention, the term "emulsion" includes "suspension".

<Vinyl Versatate Copolymer Resin (b1)>

The vinyl versatate copolymer resin (b1) is a copolymer resin containing vinyl versatate (an ester of versatic acid and vinyl alcohol) and an unsaturated organic acid as monomer units—that is, a copolymer resin comprising monomer units including vinyl versatate and an unsaturated organic acid.

Here, the unsaturated organic acid is not particularly limited as long as it has an unsaturated bond and a carboxy group, and examples include unsaturated monocarboxylic acids such as acrylic acids and methacrylic acids; unsaturated dicarboxylic acids such as maleic acid, crotonic acid, itaconic acid, fumaric acid, muconic acid, and citraconic acid; and unsaturated dicarboxylic acid half esters formed by ester bonds of these unsaturated dicarboxylic acids and an alcohol having an alkyl group with from approximately 1 to approximately 18 carbon atoms (which may be a straight-chain, branched-chain, or cyclic group). One type of these may be used alone, or two or more types may be used in combination.

Of these, unsaturated monocarboxylic acids and unsaturated dicarboxylic acids are preferable, and acrylic acids, methacrylic acids, itaconic acids, and maleic acids are more preferable in that the storage performance of the tire puncture sealant of the present invention is superior.

In this specification, acrylic acids and/or methacrylic acids are referred to as "(meth)acrylic acids".

In addition, ethylene, vinyl acetate, or the like may be suitably used as monomer units other than vinyl versatate and the unsaturated organic acid.

The vinyl versatate copolymer resin (b1) may be, for example, a random copolymer, a block copolymer, or a graft polymer.

Specific examples of such a vinyl versatate copolymer resin (b1) include unsaturated organic acid-ethylene-vinyl acetate-vinyl versatate copolymer resins and unsaturated organic acid-vinyl acetate-vinyl versatate copolymer resins. One type of these may be used alone, or two or more types may be used in combination.

Of these, unsaturated organic acid-ethylene-vinyl acetate-vinyl versatate copolymer resins are preferable in that the viscosity is low since the resins contain ethylene.

Here, the weight average molecular weight (Mw) of the vinyl versatate copolymer resin (b1) is not particularly limited but is preferably from 10,000 to 500,000 and more preferably from 50,000 to 200,000.

In addition, the glass transition point (Tg) of the vinyl versatate copolymer resin (b1) is not particularly limited but is preferably approximately $-20°$ C. or lower, more preferably approximately $-25°$ C. or lower, and even more preferably approximately $-30°$ C. or lower.

Here, the glass transition temperature (Tg) is measured using a thermograph by differential scanning calorimetry (DSC) at a temperature elevation rate of $10°$ C./minute. The temperature at the midpoint of the transition region is set as the glass transition temperature thereof (same hereafter).

(Unsaturated Organic Acid Amount)

In the present invention, the proportion of the unsaturated organic acid with respect to all monomer units constituting the vinyl versatate copolymer resin (b1) (also called the "unsaturated organic acid amount" hereafter for the sake of convenience) is preferably from 0.01 to 2.00 mass % and more preferably from 0.15 to 0.50 mass % in that the storage performance and the low-temperature injection performance of the tire puncture sealant of the present invention are superior.

(Monomer Mass Ratio)

When the vinyl versatate copolymer resin (b1) is an unsaturated organic acid-ethylene-vinyl acetate-vinyl versatate copolymer resin, the monomer ratio constituting the resin (unsaturated organic acid:ethylene:vinyl acetate:vinyl versatate) is preferably 0.01 to 2.00:2.5 to 56:2.5 to 56:20 to 90 and more preferably 0.15 to 0.50:3 to 56:3-56:2 to 90 in terms of the mass ratio (this is also called the "monomer mass ratio" hereafter).

<Emulsifier (b2)>

The vinyl versatate copolymer resin emulsion (B) described above preferably contains an emulsifier (b2) containing polyvinyl alcohol. That is, the vinyl versatate copolymer resin (b1) serving as a dispersoid is preferably dispersed in the dispersion medium due to the action of the emulsifier (b2).

The emulsifier (b2) may contain polyvinyl alcohol alone or may contain emulsifier components other than polyvinyl alcohol. Examples of emulsifier components other than polyvinyl alcohol include protective colloids such as hydroxyethyl cellulose, methyl cellulose, and carboxymethyl cellulose; nonionic surfactants such as polyoxyethylene alkyl ether, polyoxyethylene alkyl phenol ether, polyoxyethylene-polyoxypropylene block polymers, polyoxyethylene fatty acid esters, and polyoxyethylene sorbitan fatty acid esters; and anionic surfactants such as alkyl sulfuric acid ester salts, alkyl benzenesulfonic acid salts, alkyl sulfosuccinic acid salts, alkyl diphenyl ether disulfonic acid salts, polyoxyethylene alkyl sulfuric acid salts, and polyoxyethylene alkyl phosphoric acid salts. One type of these may be used alone, or two or more types may be used in combination.

Polyvinyl alcohol (PVA) is also called poval and is typically obtained by saponifying polyvinyl acetate prepared by polymerizing vinyl acetate. A low-saponified PVA or a completely saponified PVA may be used as such polyvinyl alcohol, but a partially saponified PVA having a degree of saponification of from 80 to 90 mol % is preferably used, and the degree of polymerization is preferably from 300 to 1,700.

In addition, the polyvinyl alcohol may be modified by a compound such as carboxylic acid, sulfonic acid, or a siloxane.

One type of polyvinyl alcohol may be used alone, or two or more types may be used in combination.

(Emulsifier Amount)

In the vinyl versatate copolymer resin emulsion (B) described above, the content of the emulsifier (b2) (also called the "emulsifier amount" hereafter) with respect to the solid content of the vinyl versatate copolymer resin emulsion (B) is preferably from 0.8 to 3.0 mass % and more preferably from 1.2 to 2.0 mass %.

When the emulsifier amount is within the range described above, the storage performance and the low-temperature injection performance of the tire puncture sealant of the present invention are superior.

In particular, there is a possibility that the tire puncture sealant may increase in viscosity when the amount of polyvinyl alcohol is too large, but as long as the emulsifier amount is within the range described above, increases in viscosity are suppressed, and the low-temperature injection performance can be further enhanced.

<Production Method for Vinyl Versatate Copolymer Resin Emulsion (B)>

The method for producing the vinyl versatate copolymer resin emulsion (B) serving as an emulsion of the vinyl versatate copolymer resin (b1) is not particularly limited, and an example is a method of producing (polymerizing) the emulsion by means of a conventionally known emulsion polymerization method using monomers including vinyl versatate and an unsaturated organic acid and the emulsifier (b2) described above.

The polymerization conditions are also not particularly limited, but the polymerization temperature is typically from 20 to 80° C. Examples of catalysts include persulfates such as potassium persulfate, hydrogen peroxide, and various organic peroxides. In the case of a red socks initialization system, formaldehyde sodium sulfoxylate or the like is used in combination as a reducing substance.

When producing the vinyl versatate copolymer resin emulsion (B) described above, additives such as a pH adjuster, a thickener, an antifoaming agent, a dispersant, or a preservative may be further added as necessary.

<Mass Ratio (A/B)>

In the tire puncture sealant of the present invention, the mass ratio (A/B) of the solid content of the natural rubber latex (A) to the solid content of the vinyl versatate copolymer resin emulsion (B) is preferably from 90/10 to 40/60 and more preferably from 50/50 to 70/30.

As long as the mass ratio (A/B) is within the range described above, the storage performance and the sealing performance of the tire puncture sealant of the present invention can both be achieved at high levels.

In addition, in the present invention, the solid contents of the natural rubber latex (A) and the vinyl versatate copolymer resin emulsion (B) are respectively the heating residues and are specifically the amounts of residues obtained after heating for one hour at 200° C.

For example, the emulsifier (b2) is contained in the solid content of the vinyl versatate copolymer resin emulsion (B).

[Propylene Glycol (C)]

The tire puncture sealant of the present invention preferably further contains propylene glycol (C) as an antifreezing agent.

At this time, the mass ratio (B/C) of the solid content of the vinyl versatate copolymer resin emulsion (B) to the propylene glycol (C) is preferably from 0.1 to 1.1 and more preferably from 0.3 to 0.5.

As long as the mass ratio (B/C) is within the range described above, the storage performance and the sealing performance of the tire puncture sealant of the present invention can both be achieved at high levels.

In addition, the tire puncture sealant of the present invention may contain water as a solvent, but the mass ratio (C/water) of the propylene glycol (C) to water is preferably from 0.9 to 1.8.

[Other Additives]

The tire puncture sealant of the present invention may further contain additives that may be added as desired other than the respective components described above as necessary. Examples of the additives include antifreeze agents other than propylene glycol (C) (for example, ethylene glycol, diethylene glycol, glycerin, and the like), tackifiers, fillers, antiaging agents, antioxidants, pigments (dyes), plasticizers, thixotropic agents, UV absorbents, flame retardants, surfactants (including leveling agents), dispersants, dehydrating agents, and antistatic agents. The amounts of the additives are not particularly limited.

[Production Method of the Tire Puncture Sealant]

The method for producing the tire puncture sealant of the present invention is not particularly limited, but an example is a method of producing the tire puncture sealant by sufficiently mixing the essential components and optional components described above using a stirring device such as a mixer under reduced pressure.

[Method of Using the Tire Puncture Sealant]

Next, a method of using the tire puncture sealant of the present invention will be described. However, the present invention is not limited to the following method.

First, the tire puncture sealant of the present invention is injected into a tire via an air-filling part of the tire. The method for injecting the tire puncture sealant of the present invention into the tire is not particularly limited, and it is possible to use a conventionally known method such as a method involving use of a syringe or a spray, for example. The amount of the tire puncture sealant injected into the tire is not particularly limited and is selected as appropriate depending on, for example, the size of the puncture hole.

Next, the tire is filled with air until a predetermined air pressure is reached.

The vehicle is then driven. Aggregates of particles or the like of the natural rubber of the natural rubber latex (A) or the vinyl versatate copolymer resin (b1) are formed by the compressive force or shear force exerted when the tire rotates and comes into contact with the ground, thereby enabling the sealing of the puncture hole.

EXAMPLES

The present invention will now be described in greater detail using the following working examples. The present invention is not limited to such working examples.

<Production of Vinyl Versatate Copolymer Resin Emulsion>

A plurality of types of unsaturated acid (acrylic acid or maleic acid)-ethylene-vinyl acetate-vinyl versatate copolymer resin emulsions (simply called "vinyl versatate copolymer resin emulsions" hereafter) with different "monomer mass ratios" and "emulsifier amounts" were obtained by appropriately changing the amounts of charged components.

Specifically, a solution in which water, an acrylic acid or maleic acid, vinyl acetate, vinyl versatate, polyvinyl alcohol (Poval 205, manufactured by Kuraray, degree of saponification: 88 mol %, average degree of polymerization: 500), a nonionic surfactant (polyoxyethylene alkyl ether, Emulgen 1108, manufactured by the Kao Corporation), and ferrous sulfate heptahydrate were dissolved, was added to a pressure-resistant container.

Next, the content of the pressure-resistant container was replaced with nitrogen gas, and after the temperature inside the container was increased to 45° C., the container was pressurized to 6.0 MPa with ethylene. A 5% sodium persulfate aqueous solution was added, and a 7% sodium erythorbate aqueous solution was added so as to start polymerization.

Next, after it was confirmed that the liquid temperature inside the pressure-resistant container increased, the oxidizing agents were replaced with 10% sodium persulfate and a 2% tert-butyl hydroperoxide aqueous solution at the point when four hours had passed after polymerization was started while maintaining the liquid temperature inside the container at 50° C. This was added to the pressure-resistant container, and after the pressure-resistant container was cooled so as to remove any unreacted ethylene gas at the point when the residual vinyl acetate monomers fell below 1%, the product was extracted. In this way, a vinyl versatate copolymer resin emulsion was obtained. The solid content was 53 mass %, and the glass transition temperature was −30° C.

<Tire Puncture Sealant Production>

Tire puncture sealants were produced by mixing the components shown in Table 1 below in the amounts (parts by mass) shown in the table.

At this time, a vinyl versatate copolymer resin emulsion produced as described above was used as component (B). The "monomer mass ratio" and "emulsifier amount" of the vinyl versatate copolymer resin emulsion that was used is shown in Table 1 below. Monomers that were not used are denoted as "−".

In Table 1 below, the lower numerical values (numerical values in parentheses) for components (A) and (B) respectively indicate the compounded amounts in terms of solid content and the total solid content of components (A) and (B) in terms of solid content as a relative value when the total solid content of components (A) and (B) is defined as 100 parts by mass (units: parts by mass).

In addition, water was added as necessary when producing the tire puncture sealants. The amount of water shown in Table 1 below is the total amount of water contained in the total amount of the tire puncture sealant.

<Evaluation>

The following evaluations were performed for the obtained tire puncture sealants. The results are shown in Table 1 below.

(Sealing Performance)

The sealing performance was evaluated using the obtained puncture sealants.

Specifically, a puncture hole with a size of 4 mm in diameter was first reproduced in the shoulder of the tire. Next, the tire in which the puncture hole was reproduced was mounted on a drum testing machine, and the tire puncture sealant was injected through the valve opening of the tire. The tire was filled with air so that the internal tire pressure was 200 kPa, and a drum test was performed at an ambient temperature of 25° C. (room temperature). In drum tests, one cycle consists of traveling for one minute with a load of 350 kg at a travel speed of 30 km/h.

Under the evaluation criteria for sealing performance, cases in which a seal could be established (air leakage eliminated) in 5 cycles or less were designated as "⊚"; cases in which a seal could be established in from 6 to 10 cycles were designated as "○"; cases in which a seal could be established in 11 or more cycles were designated as "Δ"; and cases in which a seal could not be established were designated as "x". When the evaluation result is "⊚" or "○", the tire puncture sealant can be evaluated as having excellent sealing performance.

(Storage Performance)

In an atmosphere at 80° C., tests were performed by subjecting the tire puncture sealants to vibration at 20 Hz with an amplitude of ±3 mm for 168 hours.

Under the evaluation criteria for storage performance, cases in which the sealant was stable with no cream generation were designated as "⊚"; cases in which cream was generated but the cream disappeared and the sealant became uniform as a result of stirring the tire puncture sealant were designated as "○"; and cases in which aggregates were generated were designated as "x". A tire puncture sealant with a result of "⊚" or "○" can be evaluated as having excellent storage performance.

(Low-Temperature Injection Performance)

The viscosity of the obtained tire puncture sealant was measured under conditions at −40° C. and at a revolution speed of 60 rpm using a BL-type viscometer (rotor No. 4). Cases in which the viscosity of the tire puncture sealant at −40° C. was at least 2000 mPa·s and less than 3000 mPa·s were designated as "⊚"; cases in which the viscosity was at least 3000 mPa·s and less than 4000 mPa·s were designated as "○"; and cases in which the viscosity was at least 4000 mPa·s were designated as "x". A tire puncture sealant with a result of "⊚" or "○" can be evaluated as having excellent low-temperature injection performance as a low-temperature property.

TABLE 1

| | | | | Comparative Examples | | | | Working Example | | | | | | | | | | |
|---|---|---|---|---|---|---|---|---|---|---|---|---|---|---|---|---|---|---|
| | | | 1 | 2 | 3 | 4 | 1 | 2 | 3 | 4 | 5 | 6 | 7 | 8 | 9 | 10 | 11 |
| Mixture composition | (A) | Natural rubber latex | 117 (70) | ← | ← | ← | ← | 67 (40) | 117 (70) | ← | 150 (90) | 117 (70) | ← | ← | ← | ← | ← |

TABLE 1-continued

Table 1

| | | | Comparative Examples | | | | Working Example | | | | | | | | | | |
|---|---|---|---|---|---|---|---|---|---|---|---|---|---|---|---|---|---|
| | | | 1 | 2 | 3 | 4 | 1 | 2 | 3 | 4 | 5 | 6 | 7 | 8 | 9 | 10 | 11 |
| | (B) | Vinyl versatate copolymer resin emulsion | 57 (30) | ← | ← | ← | ← | 113 (60) | 57 (30) | ← | 19 (10) | 57 (30) | ← | ← | ← | ← | ← |
| | (C) | Propylene glycol | 60 | ← | ← | ← | ← | 120 | 60 | ← | 20 | 60 | ← | ← | ← | ← | ← |
| | | Water | 55 | ← | ← | ← | ← | 109 | 55 | ← | 18 | 55 | ← | ← | ← | ← | ← |
| (B) Physical properties | Emulsifier amount/mass % | | 3.0 | 2.0 | 1.2 | 0.8 | ← | ← | ← | ← | ← | 0.4 | 3.0 | 3.5 | 0.8 | ← | ← |
| | Monomer mass ratio | Acrylic acid | | | | | 0.01 | 0.30 | ← | | 0.30 | ← | ← | ← | 0.80 | 2.00 | 2.50 |
| | | Maleic acid | | | | | | | | 0.30 | | | | | | | |
| | | Ethylene | 3 | ← | ← | ← | ← | ← | ← | ← | ← | ← | ← | ← | ← | ← | ← |
| | | Vinyl acetate | 7 | ← | ← | ← | 6.99 | 6.70 | ← | ← | ← | ← | ← | ← | 6.20 | 5.00 | 4.50 |
| | | Vinyl versatate | 90 | ← | ← | ← | ← | ← | ← | ← | ← | ← | ← | ← | ← | ← | ← |
| Performance | Sealing performance | | ○ | ◎ | ◎ | ◎ | ◎ | ○ | ◎ | ◎ | ◎ | ◎ | ○ | ○ | ○ | ○ | ○ |
| | Storage performance | | ◎ | X | X | X | ○ | ◎ | ◎ | ◎ | ○ | ○ | ◎ | ◎ | ◎ | ◎ | ○ |
| | Low-temperature injection performance | | X | ○ | ◎ | ◎ | ◎ | ◎ | ◎ | ◎ | ◎ | ◎ | ◎ | ○ | ◎ | ◎ | ○ |

The details of each component shown in Table 1 above are as follows.
Natural rubber latex: Hytex HA (manufactured by Nomura Trading Co., Ltd.; solid content=approximately 60 mass %)
Vinyl versatate copolymer resin emulsion: as described above
Propylene glycol: grade 1 reagent, manufactured by Wako Pure Chemical Industries, Ltd.

Examining Comparative Examples 1 to 4 shown in Table 1 above, using Comparative Example 1 as a reference, it can be seen that although reducing the emulsifier amount yields an improvement in the low-temperature injection performance, the storage performance is diminished.

In contrast, in Working Examples 1 to 6 and Working Examples 9 to 11, it can be seen that the low-temperature injection performance can be improved while maintaining good storage performance by using the component (B) in which an unsaturated organic acid (acrylic acid or maleic acid) is copolymerized, even when the emulsifier amount is reduced to a level equal to or lower than that of Comparative Example 4.

In addition, it can be seen from the results of Working Examples 7 and 8 that the low-temperature injection performance can be improved by using the component (B) in which an unsaturated organic acid is copolymerized, even when the emulsifier amount is not reduced.

The invention claimed is:

1. A tire puncture sealant comprising a natural rubber latex (A); and a vinyl versatate copolymer resin emulsion (B), the vinyl versatate copolymer resin emulsion being an emulsion of a vinyl versatate copolymer resin (b1) containing vinyl versatate and an unsaturated organic acid as monomer units, said vinyl versatate copolymer resin (b1) having a glass transition temperature of −25° C. or less;
   wherein a proportion of the unsaturated organic acid with respect to all monomer units constituting the vinyl versatate copolymer resin (b1) is from 0.01 to 2.00 mass %.

2. The tire puncture sealant according to claim 1, wherein the vinyl versatate copolymer resin emulsion (B) contains an emulsifier (b2) containing polyvinyl alcohol; and a content of the emulsifier (b2) is from 0.8 to 3.0 mass % with respect to a solid content of the vinyl versatate copolymer resin emulsion (B).

3. The tire puncture sealant according to claim 2, wherein the vinyl versatate copolymer resin (b1) is an unsaturated organic acid-ethylene-vinyl acetate-vinyl versatate copolymer resin.

4. The tire puncture sealant according to claim 2, wherein a mass ratio (A/B) of a solid content of the natural rubber latex (A) to a solid content of the vinyl versatate copolymer resin emulsion (B) is from 90/10 to 40/60.

5. The tire puncture sealant according to claim 1, wherein the vinyl versatate copolymer resin (b1) is an unsaturated organic acid-ethylene-vinyl acetate-vinyl versatate copolymer resin.

6. The tire puncture sealant according to claim 5, wherein a mass ratio (A/B) of a solid content of the natural rubber latex (A) to a solid content of the vinyl versatate copolymer resin emulsion (B) is from 90/10 to 40/60.

7. The tire puncture sealant according to claim 1, wherein a mass ratio (A/B) of a solid content of the natural rubber latex (A) to a solid content of the vinyl versatate copolymer resin emulsion (B) is from 90/10 to 40/60.

8. The tire puncture sealant according to claim 3, wherein a mass ratio (A/B) of a solid content of the natural rubber latex (A) to a solid content of the vinyl versatate copolymer resin emulsion (B) is from 90/10 to 40/60.

* * * * *